United States Patent
Mangano et al.

(10) Patent No.: US 11,906,994 B2
(45) Date of Patent: Feb. 20, 2024

(54) POWER SUPPLY CIRCUIT, CORRESPONDING DEVICE AND METHOD

(71) Applicants: STMicroelectronics S.r.l., Agrate Brianza (IT); STMicroelectronics (Rousset) SAS, Rousset (FR)

(72) Inventors: Daniele Mangano, San Gregorio di Catania (IT); Andrei Tudose, Chateauneuf (FR); Francesco Clerici, Aci Castello (IT); Pasquale Butta', Messina (IT)

(73) Assignees: STMicroelectronics S.r.l., Agrate Brianza (IT); STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/836,524

(22) Filed: Jun. 9, 2022

(65) Prior Publication Data

US 2022/0397923 A1    Dec. 15, 2022

(30) Foreign Application Priority Data

Jun. 10, 2021   (IT) .......................... 102021000015197

(51) Int. Cl.
*G06F 1/00* (2006.01)
*G05F 1/46* (2006.01)
*G06F 1/3296* (2019.01)

(52) U.S. Cl.
CPC ............ *G05F 1/468* (2013.01); *G06F 1/3296* (2013.01)

(58) Field of Classification Search
CPC .................................. G06F 1/3296; G05F 1/468
See application file for complete search history.

(56) References Cited

U.S. PATENT DOCUMENTS

| | | | |
|---|---|---|---|
| 8,145,934 B1 * | 3/2012 | Ferris ....................... | G06F 1/04 713/502 |
| 8,552,703 B2 | 10/2013 | Liu et al. | |
| 10,090,756 B1 * | 10/2018 | Tsai ....................... | H02M 1/36 |
| 11,029,716 B1 | 6/2021 | Chan et al. | |
| 2007/0216383 A1 * | 9/2007 | Al-Shyoukh ........... | G05F 1/468 323/280 |

(Continued)

FOREIGN PATENT DOCUMENTS

WO    2018060990 A1    4/2018

OTHER PUBLICATIONS

IT Search Report and Written Opinion for priority application, IT 102021000015197, report dated Feb. 15, 2022, 13 pgs.

*Primary Examiner* — Mohammed H Rehman
(74) *Attorney, Agent, or Firm* — Crowe & Dunlevy

(57) ABSTRACT

A voltage regulator is embedded in a circuit intermediate a first node (coupled to a battery) and a second node (supplying power to an external memory). The voltage regulator is activatable in a first mode of operation for startup during which an voltage is applied to the second node that increases towards a supply threshold. In response to the voltage at the second node reaching the supply threshold, the voltage regulator transitions to a second mode of operation where a programmable regulated voltage (higher than the supply threshold) is applied to the second node. In response to receipt of a low-power operation request, a first high-drive regulator circuitry is deactivated and a second low-power regulator circuitry is activated to provide a third mode of operation at low power.

18 Claims, 5 Drawing Sheets

(56) References Cited

U.S. PATENT DOCUMENTS

| | | | |
|---|---|---|---|
| 2008/0232144 A1* | 9/2008 | Klein | H02M 1/36 |
| | | | 363/49 |
| 2009/0115379 A1* | 5/2009 | Al-Shyoukh | G05F 1/56 |
| | | | 323/238 |
| 2011/0133709 A1 | 6/2011 | Mengad | |
| 2014/0028278 A1 | 1/2014 | Pedersen et al. | |
| 2017/0054356 A1 | 2/2017 | Wright | |
| 2019/0146530 A1* | 5/2019 | Kotrc | G05F 1/562 |
| | | | 323/265 |
| 2020/0075061 A1 | 3/2020 | Rowley | |
| 2020/0326739 A1 | 10/2020 | Zhao et al. | |

* cited by examiner

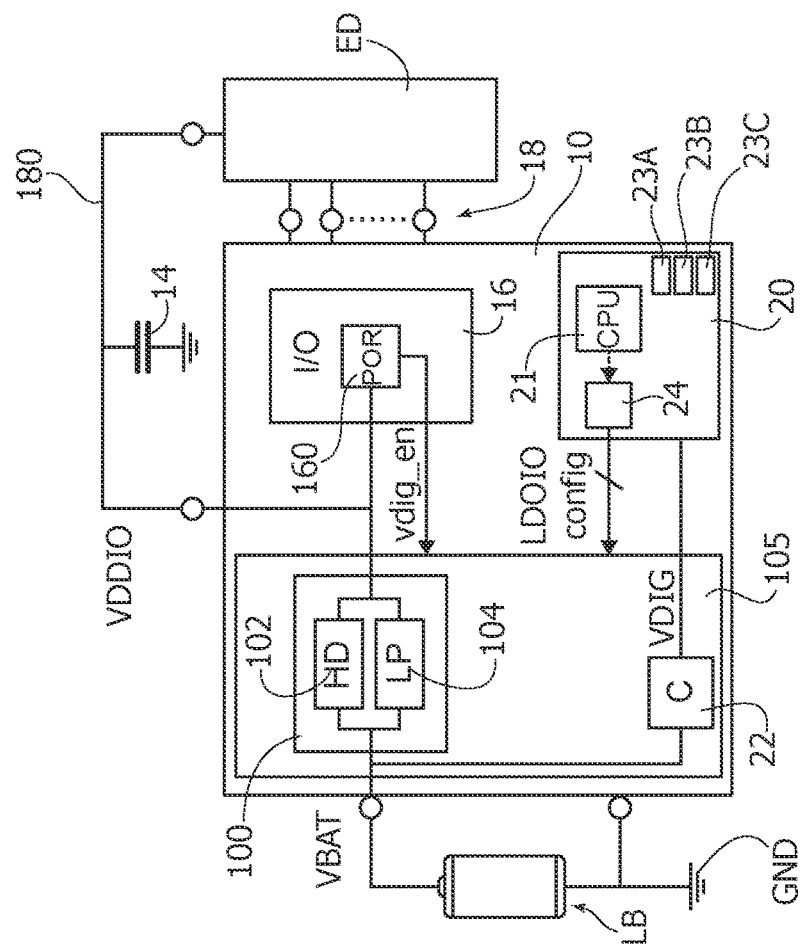
FIG. 7
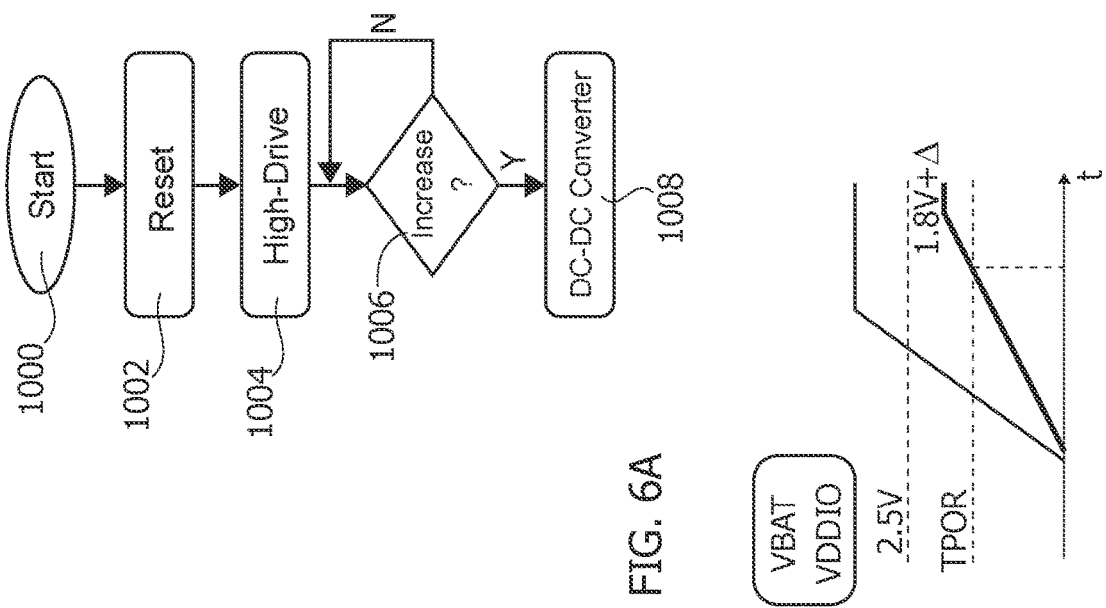
FIG. 6
FIG. 6A

POWER SUPPLY CIRCUIT, CORRESPONDING DEVICE AND METHOD

PRIORITY CLAIM

This application claims the priority benefit of Italian Application for Patent No. 102021000015197, filed on Jun. 10, 2021, the content of which is hereby incorporated by reference in its entirety to the maximum extent allowable by law.

TECHNICAL FIELD

The description relates to power supply circuits.

One or more embodiments can be applied in a variety of devices such as home appliances, home automation devices, smart plugs/lights/locks, cameras, voice control devices, Wi-Fi positioning systems and industrial wireless control systems, for instance.

BACKGROUND

Modern re-chargeable lithium-ion batteries commonly have an operating voltage up to 4.5V and a charging voltage (slightly) higher than such an operating voltage.

Most commercial technologies do not include devices able/required to operate above 3.6V. Reaching higher voltages involves using "high-voltage" circuits that may be fairly complex and increase semiconductor area occupancy, cost and power consumption.

There is a need in the art to address the foregoing issues.

SUMMARY

One or more embodiments relate to a circuit.

One or more embodiments relate to a corresponding device. A MicroController Unit (MCU) with an associated (external) memory (e.g., a flash memory) may be exemplary of such a device.

One or more embodiments relate to a corresponding method.

One or more embodiments may include dual-LDO (Low DropOut) architecture and a control feature admitting changing MCU (micro-controller unit) power modes.

One or more embodiments support 4.5V supply with adequate power consumption performance as desirable for low-power microcontroller applications in the area of IoT (Internet of Things).

A circuit as disclosed herein may start at 1.8V at power-on in order to prevent potential damage to an external device (e.g., a memory) with the possibility of re-programming the voltage up to 3.3V (in order to support other devices, for instance).

In one or more embodiments, full power-on operation may start (only) after the supply voltage has reached an adequate level.

One or more embodiments admit low-power operation where the circuit is active in a low-power mode.

One of more embodiments extend the operating range up to 4.5V with reduced semiconductor area occupancy, reduced power consumption and cost with the capability of supporting low-power modes compatible with IoT applications, for instance.

BRIEF DESCRIPTION OF THE DRAWINGS

One of more embodiments will now be described, by way of example only, with reference to the annexed figures, wherein:

FIG. 6 is a flow-chart exemplary of possible operation of embodiments of the present description;

FIG. 6A is illustrate an exemplary operation corresponding to FIG. 6;

FIG. 7 is a block diagram providing additional details with respect to FIGS. 4 and 5;

DETAILED DESCRIPTION

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

In the ensuing description, various specific details are illustrated in order to provide an in-depth understanding of various examples of embodiments according to the description. The embodiments may be obtained without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like, that may be present in various points of the present description do not necessarily refer exactly to one and the same embodiment. Furthermore, particular configurations, structures, or characteristics may be combined in any adequate way in one or more embodiments.

The headings/references used herein are provided merely for convenience and hence do not define the extent of protection or the scope of the embodiments.

For the sake of brevity and simplicity, a same designation (VBAT, VDDIO, and so on, for instance) may be used in the following to designate both a certain circuit node or line and a signal (a voltage signal, for instance) occurring at that node or line.

Figure 1:
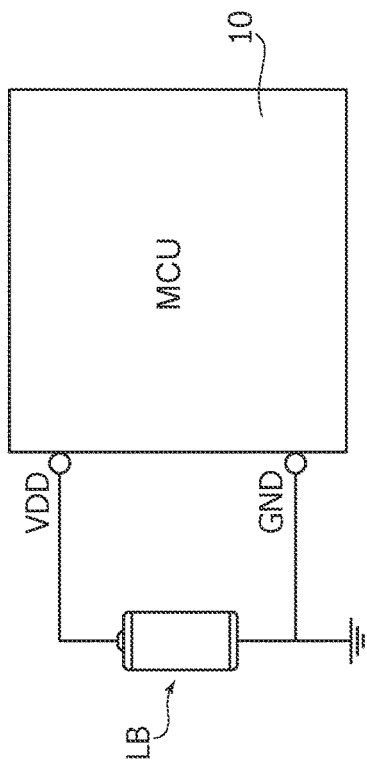
FIG. 1 is a general block diagram of a circuit as discussed in the instant description.

FIG. 1 is a simplified representation of a circuit 10 such as, for instance, a MicroController Unit (MCU) supplied via a supply source such as a battery LB, for instance.

A (rechargeable) lithium-ion battery may be exemplary of the battery LB. Those of skill in the art will otherwise appreciate that the embodiments are not limited to the presence of such a battery, which is otherwise distinct from the embodiments. For instance, the battery LB may be a battery intended to be coupled to the circuit 10 ("plugged-in") only by an end-user and/or over limited periods of time.

A battery such as LB is representative of a supply source configured to apply to the circuit 10 a supply voltage between a "hot" node VDD and ground GND.

As discussed in the foregoing, while batteries such as modern re-chargeable lithium-ion batteries have an operating voltage up to 4.5V and a (slightly) higher charging voltage, most commercial technologies do not include devices able/required to operate above 3.6V.

Reaching higher voltages involves using "high-voltage" circuits that may be fairly complex and increase semiconductor area occupancy, cost and power consumption.

Figure 2:
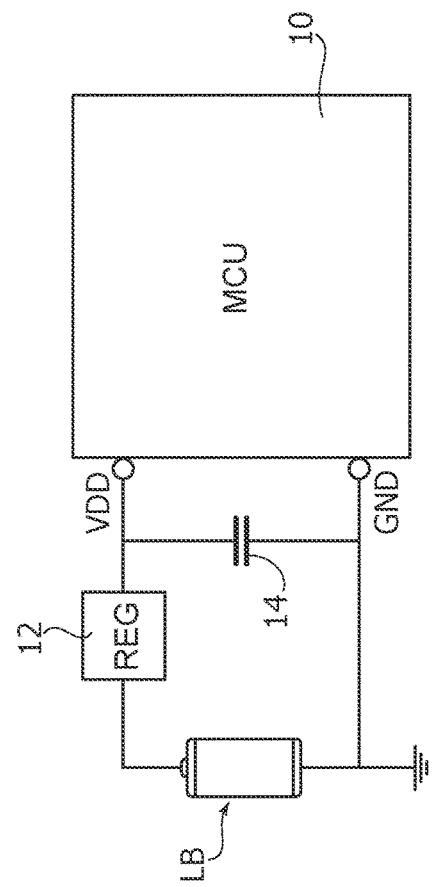
FIGS. 2 and 3 are block diagrams exemplary of conventional arrangements resorted to in connection with a circuit as illustrated in FIG. 1.

FIG. 2 is exemplary of one such conventional approach where an (external) voltage regulator (REG) 12 is provided between the battery LB and the node VDD in the circuit 10, with a coupling capacitor 14 provided between the node VDD and ground GND.

An arrangement as exemplified in FIG. 2 suffers from the presence of extra components, which negatively affect the Bill of Materials (BoM) with increased size, complexity and cost.

Additional drawbacks involve increased power consumption in the active mode and also in a low-power (quiescent) mode.

All of the foregoing renders the solution exemplified in FIG. 2 hardly attractive for applications such as Internet of Things (IoT) applications where reduced consumption in a low-power mode is desirable.

Figure 3:
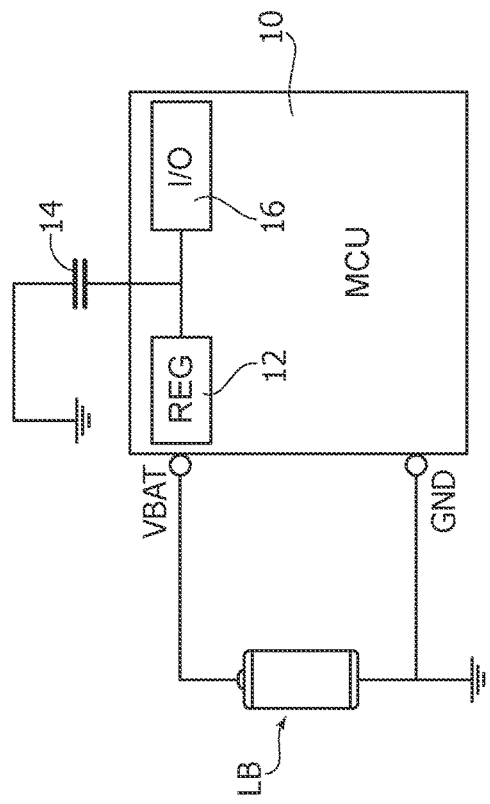

Another conventional approach as exemplified in FIG. 3 is based on System on Chip (SoC) architecture wherein the regulator 12 is "embedded" in the circuit 10 with the provision of input/output (I/O) analog circuitry 16 similarly embedded in the circuit 10. The decoupling capacitor 14 can be arranged between a node intermediate the embedded regulator 12 and the circuitry 16 and ground GND.

While providing slightly better performance, an arrangement as exemplified in FIG. 3 essentially suffers from the same drawbacks discussed in connection with FIG. 2.

One or more embodiments as exemplified herein, expand upon the embedded layout of the FIG. 3 by providing an embedded voltage regulator designated 100 as a whole.

Figure 4:
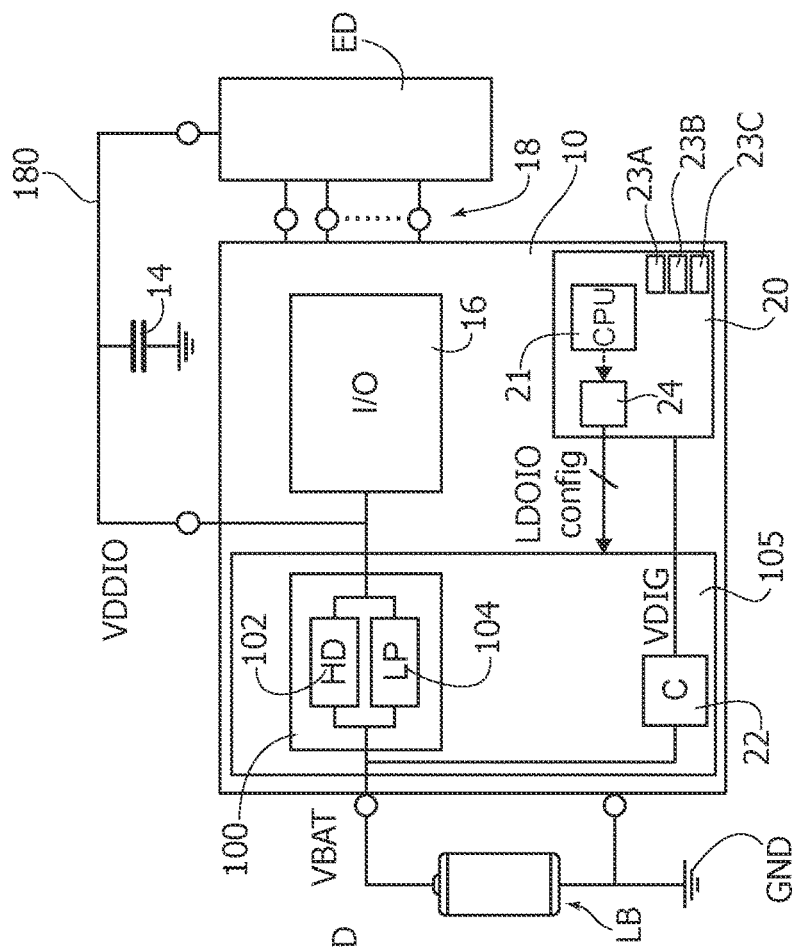
FIG. 4 is a block diagram exemplary of embodiments of the present description.

For that reason, unless the context indicates otherwise, the general disclosure provided in the foregoing in connection with FIGS. 1 to 3 also applies to the other figures and will not be repeated for brevity in connection with the figures from FIG. 4 onwards.

The regulator 100 embedded in the circuit 10 may be a low drop-out (LDO) regulator comprising high-drive (HD) LDO circuitry, designated 102, as well as low-power (LP) LDO circuitry, designated 104.

LDO is an acronym for "Low Drop-Out" and designates a DC linear voltage regulator architecture configured to regulate its output voltage (even) when the voltage supplied thereto is very close to the output voltage.

As exemplified in FIG. 4, the regulator 100 is configured to operate between: a first node VBAT configured to have applied thereto the voltage from the supply source (e.g., 4.5V from a battery such LB), and a second node VDDIO configured to supply via a line 180 an external device designated ED.

The device ED being designated "external" emphasizes that this may represent a distinct element from the circuit 10. A memory such as flash memory coupled to an MCU such as 10 may be exemplary of such an external device ED.

As illustrated in FIG. 4 a decoupling capacitor 14 can be arranged intermediate the node VDDIO (line 180) and ground.

The LDO regulator 100 thus receives at the node VBAT a voltage of 2.5V-4.5V, for instance. This is the voltage that can be supplied from a battery such as LB coupled between the node VBAT and ground GND.

The (regulated) supply voltage applied to the external device ED by the node VDDIO (via the line 180) will expectedly be lower, in the 1.8V-3.3V range.

In FIG. 4, reference 16 again designates input/output (I/O) circuitry of an analog type, for instance, which can be assumed to be of the "always on" type, thus being capable of sensing the voltage at the node VDDIO.

Also, for the sake of this description one may assume that the circuit 10 is configured to co-operate with the external device ED via a set of I/O nodes (pins) 18.

It will be otherwise appreciated that the specific characteristics and mode of operation of the I/O circuitry 16 and the external device ED coupled with the circuit 10 are of no specific relevance for the embodiments.

The embodiments can thus be regarded as essentially "transparent" the specific characteristics and mode operation of the circuitry 16 and/or the external device ED.

Reference 20 in FIG. 4 denotes low-voltage digital logic circuitry intended to be supplied from the node VBAT at the input of the regulator 100 via a DC-DC (low-power mode) converter (C) 22 configured to provide to the low-voltage digital logic 20 a supply voltage VDIG (1.1V, or 0.9V in low-power mode, for instance).

As illustrated herein, the embedded regulator 100 is a dual-mode (high-drive and low-power) designed to have: high consumption (only) when the circuit 10 (here, an MCU) into which the regulator 100 is embedded is in a normal mode of operation, and reduced consumption when the circuit 10 is in low-power mode.

To that effect, the regulator 100 can be designed (in a manner known per se to those of skill in the art) to include: a high drive section or circuitry 102 designed to provide adequate performance for dynamic activity (drive, and so on) even if this may involve a high quiescent current and/or low efficiency, and a low-power section or circuitry 104 designed to have performance limited, for instance, to wake-up capability and retention of the "live" state of the circuit 10 when desired, with the advantage of reduced consumption compatible with low-power modes of the MCU 10.

It is noted that (as exemplified at 180) the embedded regulator 100 can also be used to supply external devices ED, such as a memory, for instance. For instance, the external device ED can be a flash memory having operating voltages in the range of 1.8V to 3V (NOR).

Figure 5:
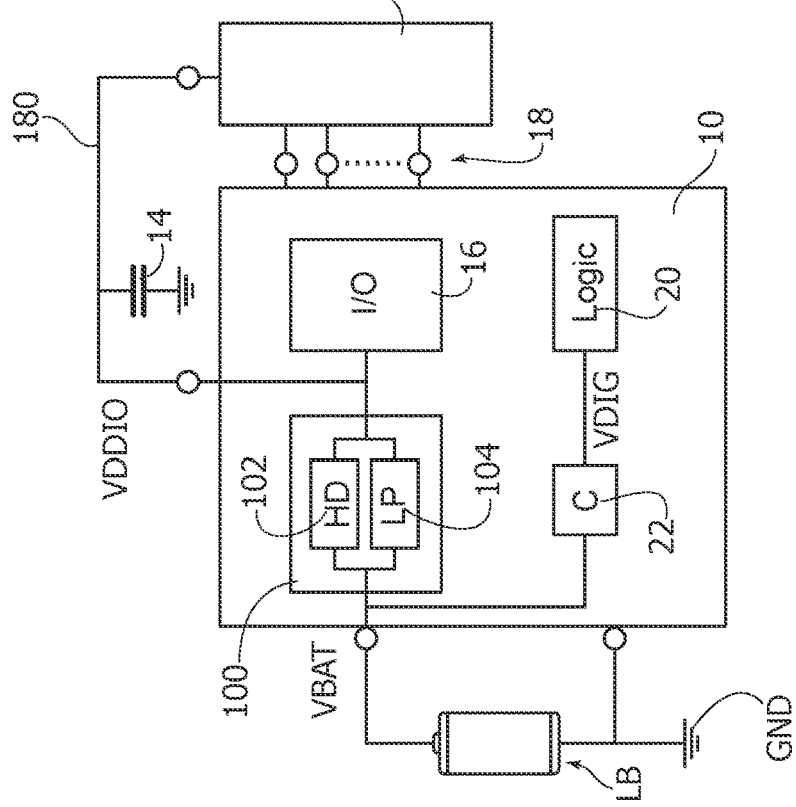
FIG. 5 is a block diagram providing additional details with respect to FIG. 4.

FIG. 5 further details the possibility for the embedded regulator 100 to be incorporated together with the DC-DC low-power mode converter 22 to a power management unit 105 within the circuit 10.

FIG. 5 also details the possibility for the logic circuitry 20 to include a processing unit or CPU 21 as well as a random-access memory (RAM), a read-only memory (ROM) and a one-time programmable (OTP) memory units 23A, 23B and 23C as well as a configuration register 24 with the purpose of sending—as discussed in the following—a configuration signal LDOIO config towards the power management unit 105 (primarily the regulator 100).

Briefly, an arrangement as illustrated herein is exemplary of a circuit 10 comprising a first node, VBAT configured to receive a first voltage applied thereto as well as a second node, VDDIO configured to be coupled (see the line 180) with an electrically powered device ED such as a flash memory to provide electrical supply power to that device, with the circuit 10 configured (e.g., via the pins 18) for communication with the device ED.

As illustrated, the voltage regulator 100 embedded in the circuit 10 is coupled to the first node VBAT and to the second node VDDIO to provide a regulated voltage at the second node towards the external device ED.

As illustrated, the voltage regulator 100 includes first regulator circuitry 102 and second regulator circuitry 104 configured to provide full-power and low-power operation of the voltage regulator 100.

An arrangement as detailed in FIG. 5 facilitates operating in such a way that at power-on the regulator 100 starts supplying the external device with a voltage that is reduced (e.g., below a supply threshold of 1.8V, for instance) to avoid potential damage to the external device (memory) ED.

The possibility will then exist to re-program the voltage provided by the embedded LDO regulator 10 to higher voltages (3.3V, to support other devices, for instance) that is, with a regulated voltage from the LDO regulator 100 applied to the node VDDIO that may vary from 1.8V to 3.3V.

The voltage regulator 100 is thus adapted to be activated in a first startup mode during which the voltage regulator 100 applies to the second node VDDIO a voltage increasing towards a supply threshold.

The circuit 10 comprises control circuitry such as 20 adapted to be activated (as detailed in the following) in response to the voltage at the output node VDDIO reaching the supply threshold.

The control circuitry 20 is configured to bring the voltage regulator 100 to a second mode of operation where the voltage regulator 100 applies to the second node VDDIO a regulated voltage higher than the supply threshold.

The control circuitry 20 comprises processing circuitry configured to (re)program the value of the regulated voltage at the node VDDIO to a value higher than the supply threshold discussed previously.

For instance, voltage regulator 100 can be configured to receive at the node VBAT a voltage in a first voltage range between a lower bound (e.g., approximately 2.5V) and an upper bound (e.g., approximately 4.5V) and to apply to the second node, VDDIO a regulated voltage in a second voltage range between the supply threshold (e.g., approximately 1.8V) and a respective upper bound (e.g., approximately 3.3V).

It will be appreciated that, in the example considered herein, the lower bound of 2.5V is higher than the supply threshold of 1.8V and the upper bound of 4.5V is higher than the respective upper bound of 3.3V.

Of course, the quantitative figures reported throughout the present description are merely exemplary and not limiting of the embodiments.

A desired user configuration can thus be "pushed" via the CPU 21 for instance through a firmware stored in the RAM memory or boot ROM/OTP from the blocks 23A to 23C.

In the flow-chart of FIG. 6, block 1000 is exemplary of start-up at power-on (due to a battery LB being coupled to the circuit 10).

After reset as represented by block 1002, the high-drive circuitry in the LDO regulator 1000 is switched-on with the DC-DC converter 22 kept in an "off" (inactive) state, as represented by block 1004 in FIG. 6.

Block 1006 in FIG. 6 is exemplary of a check as to whether the voltage at the node VDDIO has increased up to a certain threshold (1.8V, for instance).

A negative outcome (N) from the check of step 1006 causes the circuitry to loop back.

Conversely, a positive outcome (Y) of the check 1006 (the voltage VDDIO has reached the threshold) causes switch-on of the DC-DC converter 22 with the high-drive circuitry 102 in the LDO regulator 100 kept active as represented by block 1008 in the flow-chart of FIG. 6.

The diagram of FIG. 6A is exemplary of operation as discussed previously, showing the voltage VDDIO ramping up at a moderate rate with respect to VBAT towards the threshold designated TPOR (1.8V, for instance) to settle then at voltage of 1.8V plus an extra value Δ.

It is noted that, in operation as discussed previously, full operation is started only after the voltage at node VDDIO has reached an adequate level.

This may involve an autonomous start-up of the LDO regulator 100 (high drive circuitry 102) as soon as the circuit 10 is energized (battery LB plugged in, for instance).

As exemplified in FIG. 7 (as noted, corresponding parts or elements are indicated with corresponding reference symbols throughout the figures) a dedicated power-on reset (POR) voltage monitor 160 can be provided in the circuitry 16, the voltage monitor 160 being sensitive to the voltage at the node VDDIO and may assert an enable signal vdig_en towards the power management unit 105 to switch-on the DC-DC converter 22 and the digital logic 20 (including the CPU 21).

Figure 8:
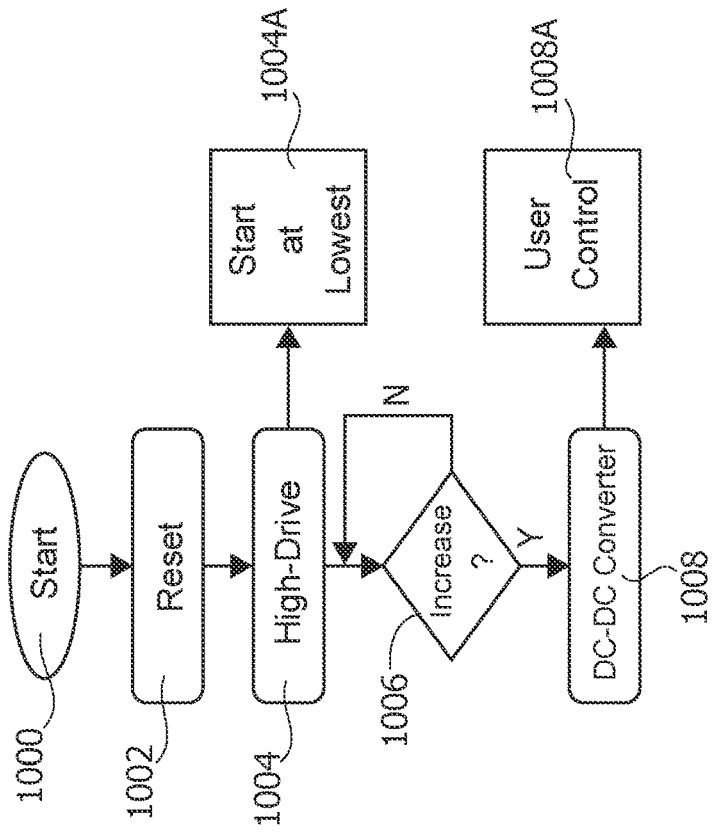

The flow-chart of FIG. 8 is an expanded version of the flow-chart of FIG. 6 showing that, at switch-on as represented by block 1004, the LDO regulator may start at the lowest (minimum) voltage compatible with the external device ED, e.g., 1.8V. This is represented by block 1004A in FIG. 8.

Also, block 1008A in the flow-chart of FIG. 8 is exemplary of the fact that once an (adequate) value VDIG is available for the DC-DC converter 22, a user can take control of the circuit operation (via the CPU 21, for instance) and re-program the LDO configuration registers to increase the LDO output voltage up to values compatible with proper external device operation (e.g., 3.3V).

Figure 9:
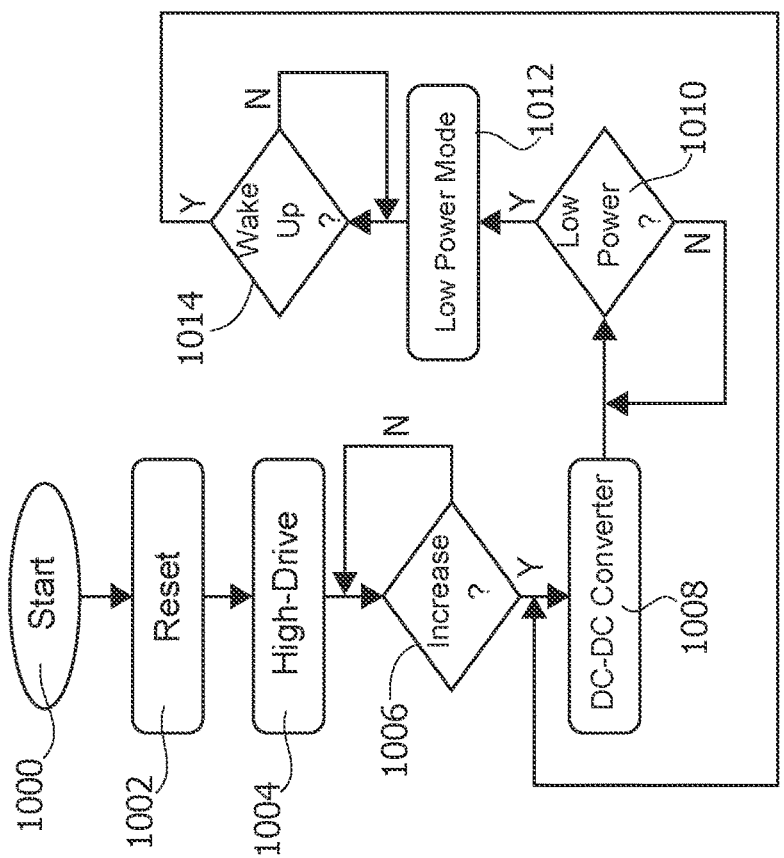
FIG. 8 and FIG. 9 are flow-charts exemplary of possible operation of embodiments of the present description.

The flow-chart of FIG. 9 is a further expanded version of the flow-chart of FIG. 6 (and FIG. 8 as well), showing the possibility for the circuit 10 to evolve from the condition exemplified by block 1008 (DC-DC converter 22 switched-on with the LDO regulator having the high-drive circuitry 102 activated and the low-power circuitry 104 de-activated) to a step 1010 where a check is made as to whether a (software generated) request for low-power mode operation has been received.

Such a request may be generated (in a manner known per se to those of skill in the art) in response to conditions where activity of the circuit 10 (and the external device ED) has been limited over a time interval so that circuit performance can be limited, for instance, to wake-up capability and retention of the "live" state of the circuit 10.

The external device ED can be similarly switched to a low-power mode. For instance, if the external device ED is a memory, such a memory may be unavailable for access during that time.

In the case of a negative outcome (N) of the check at bloc 1010, the system simply loops back.

In the presence of a positive outcome (Y) of the check of block 1010 (that is, a valid request for low-power operation has been received) the circuit 10 is switched to a low-power, low-consumption state (as represented by block 1012 in FIG. 9) where the LDO regulator 10 is switched to low-power operation with the high-drive circuitry 102 de-activated (turned-off), the low-power circuitry 104 activated (turned-on), and the DC-DC converter 22 de-activated.

At this point, the circuit evolves to a state (exemplified by block 1014) where a check is made as to the occurrence of any "wake-up" event.

Such an event may correspond to dynamic activity of the circuit 10 (and the external device ED) being resumed with adequate performance involved.

In the case of a negative outcome (N) of the check of block 1014, the circuit simply loops back.

Conversely, in the presence of a positive outcome (Y) of the check of block 1014 (a wake-up event has occurred) operation is returned to the block 1008, wherein the LDO regulator 100 with the high-drive circuitry 102 activated (turned-on) and the low-power circuitry 104 de-activated (turned-off) with the DC-DC converter 22 likewise (re) activated.

In the low-power mode, as exemplified by block 1012 in FIG. 9, the LDO regulator 100 is still active, but in a low-power mode, in contrast with the high-drive mode as exemplified by block 1008 in FIG. 9.

The LDO regulator 100 can be switched to the low-power mode in response to the DC-DC converter 22 being requested to be switched-off via the signal vdig_en being set, for instance to "0", due to a low-power mode request (indicated by a block designated 1010 for consistency with the homologous block in the flow-chart of FIG. 9) sent to logic circuitry 162 in the circuitry 16 that is also sensitive to wake-up events WU.

The LDO regulator 100 can be switched (back) to a high-power mode (high-drive circuitry 102 turned-on and low-power circuitry 104 turned-off, respectively) in response to wake-up being requested (e.g., via vdig_en being set to "1").

The logic value for vdig_en may thus result from a combination of a signal from the power-on reset circuit 160, a low-power mode request 1010 from the CPU 21, for instance, and a wake-up request WU as possibly received from the outer environment or an internal timer.

Figure 10:
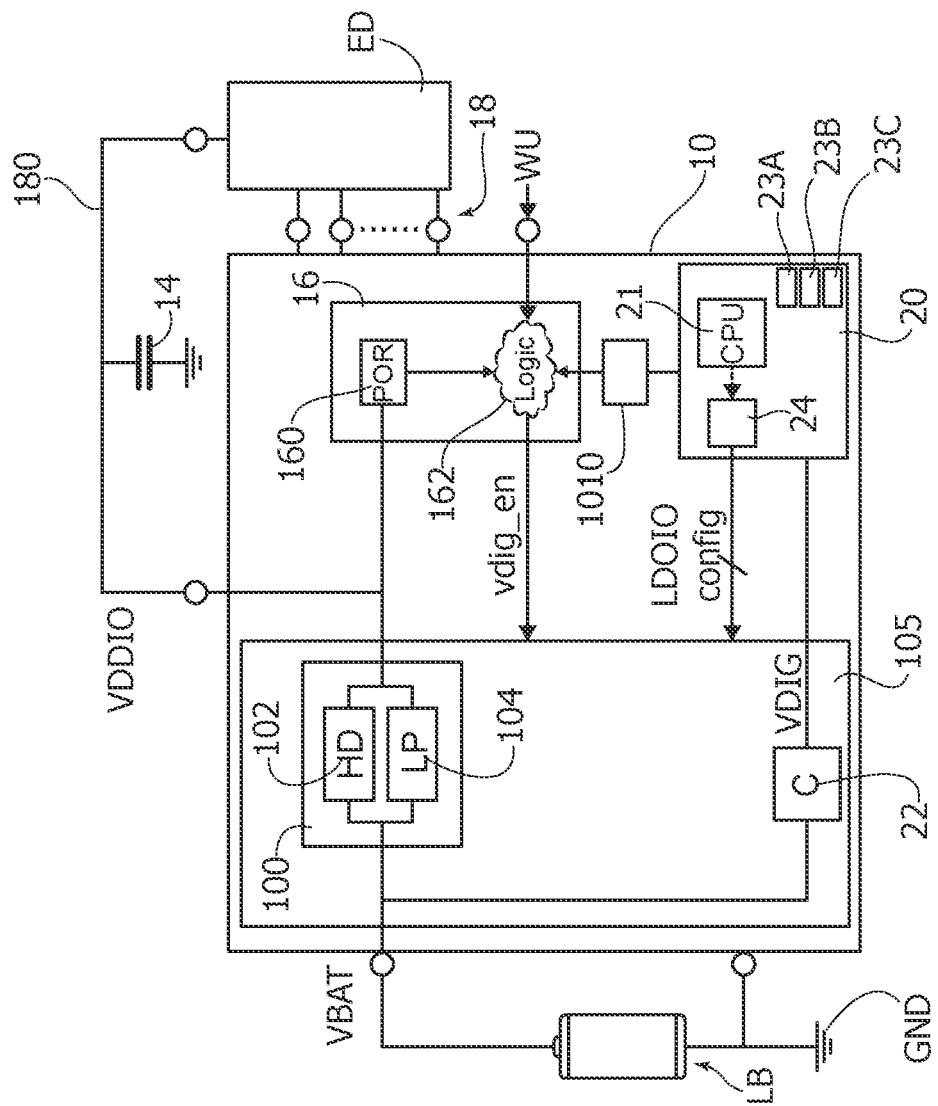
FIG. 10 is a block diagram representative of low-power mode operation of embodiments of the present description.

As illustrated in FIG. 10, a low-power mode request such as 1010 can be triggered (via software) by the CPU 21 as currently occurring in microcontrollers.

Wake-up requests WU may be received via external pins (or, possibly, from internal sources such as real-time clock RTC).

One or more embodiments may thus provide extended operating voltage ranges up to, e.g., 4.5V, with reduced semiconductor area occupancy and reduced power consumption, cost, while also providing support for low-power modes compatible with applications such as Internet of Things (IoT) applications, for instance.

One or more embodiments facilitate providing devices supporting high-voltage supply as desirable for lithium-ion batteries having an operating voltage in the range of 4.5V, for instance.

One or more embodiments also facilitate supplying an external device (such as a flash memory, for instance) in a safe way, without risk of damage at power-on.

Without prejudice to the underlying principles, the details and embodiments may vary, even significantly, with respect to what has been described in the foregoing, by way of example only, without departing from the extent of protection.

The claims are an integral part of the technical teaching provided herein in respect of the embodiments.

The extent of protection is determined by the annexed claims.

The invention claimed is:

1. A circuit, comprising:
a first node configured to receive a first voltage;
a second node configured to provide electrical supply power for output;
a first voltage regulator coupled to the first node and the second node and configured to provide a first regulated voltage at the second node;
wherein the first voltage regulator is activatable in a first mode of operation for startup during which the first voltage regulator applies to said second node a voltage that increases towards a supply threshold;
a power on reset circuit having an input receiving the voltage at said second node and configured to assert an enable signal when the increase of the voltage at said second node reaches the supply threshold;
a second voltage regulator coupled to the first node and configured to provide a second regulated voltage at a third node, wherein said second voltage regulator is activated in response to assertion of the enable signal; and
control circuitry powered by the second regulated voltage at the third node and configured, when the second voltage regulator is activated, to control a change of the first voltage regulator to a second mode of operation where a regulated voltage higher than said supply threshold is applied to said second node, and further configured, when low-power operation request signal is received, to control a change of the first voltage regulator to a third mode of operation providing low power operation at the second node and to deassert the enable signal to deactivate the second voltage regulator.

2. The circuit of claim 1, wherein the control circuitry comprises processing circuitry configured to program a value of said regulated voltage higher than said supply threshold.

3. The circuit of claim 1, wherein the first voltage regulator is configured to:
receive at said first node a voltage in a first voltage range between a lower bound and an upper bound; and
apply to said second node, in said second mode of operation, the regulated voltage higher than said supply threshold in a second voltage range between said supply threshold and a respective upper bound;
wherein said lower bound is higher than said supply threshold and said upper bound is higher than said respective upper bound.

4. The circuit of claim 3, wherein said lower bound is approximately, 2.5V and said upper bound is approximately 4.5V.

5. The circuit of claim 3, wherein said supply threshold is approximately 1.8V and said upper bound is approximately 3.3V.

6. The circuit of claim 1, wherein: the first voltage regulator includes first regulator circuitry configured to provide full-power operation and second regulator circuitry configured to provide low-power operation.

7. The circuit of claim 6, wherein the voltage regulator is configured to transition from said third mode of operation mode back to said second mode of operation in response to receipt of a wake-up signal.

8. The circuit of claim 1, wherein the first voltage regulator is activatable in said first mode of operation in response to a supply source being coupled to the first node.

9. The circuit of claim 1, wherein the first voltage regulator comprises a Low Drop-Out (LDO) regulator and the control circuitry comprises a microcontroller unit.

10. A system, comprising:
an electrically powered device; and
a circuit including:
- a first node configured to receive a first voltage;
- a second node coupled to provide electrical supply power to said electrically powered device;
- a first voltage regulator coupled to the first node and the second node and configured to provide a first regulated voltage at the second node;
- wherein the first voltage regulator is activatable in a first mode of operation for startup during which the first voltage regulator applies to said second node a voltage that increases towards a supply threshold;
- a power on reset circuit having an input receiving the voltage at said second node and configured to assert an enable signal when the increase of the voltage at said second node reaches the supply threshold;
- a second voltage regulator coupled to the first node and configured to provide a second regulated voltage at a third node, wherein said second voltage regulator is activated in response to assertion of the enable signal; and
- control circuitry powered by the second regulated voltage at the third node;
- wherein the control circuitry is configured, when the second voltage regulator is activated, to control a change of the first voltage regulator to a second mode of operation where a regulated voltage higher than said supply threshold is applied to said second node, and further configured, when low-power operation request signal is received, to control a change of the first voltage regulator to a third mode of operation providing low power operation at the second node and to deassert the enable signal to deactivate the second voltage regulator.

11. The system of claim 10, wherein the circuit is configured for communication with said electrically powered device.

12. The system of claim 11, wherein the electrically powered device is a memory.

13. The system of claim 10, wherein the first voltage regulator is activated in said first mode of operation in response to a supply source being coupled to said first node.

14. The system of claim 10, wherein the control circuitry comprises processing circuitry configured to program a value of said regulated voltage higher than said supply threshold.

15. The system of claim 10, wherein the first voltage regulator is configured to:
- receive at said first node a voltage in a first voltage range between a lower bound and an upper bound; and
- apply to said second node, in said second mode of operation, the regulated voltage higher than said supply threshold in a second voltage range between said supply threshold and a respective upper bound;
- wherein said lower bound is higher than said supply threshold and said upper bound is higher than said respective upper bound.

16. The circuit of claim 10, wherein: the first voltage regulator includes first regulator circuitry configured to provide full-power operation and second regulator circuitry configured to provide low-power operation.

17. The circuit of claim 16, wherein the voltage regulator is configured to transition from said third mode of operation mode back to said second mode of operation in response to receipt of a wake-up signal.

18. The circuit of claim 10, wherein the first voltage regulator comprises a Low Drop-Out (LDO) regulator and the control circuitry comprises a microcontroller unit.

\* \* \* \* \*